April 29, 1952  R. R. RICHMOND  2,594,995
VEGETABLE CLEANING AND TOPPING DEVICE
Original Filed Dec. 11, 1947  2 SHEETS—SHEET 1
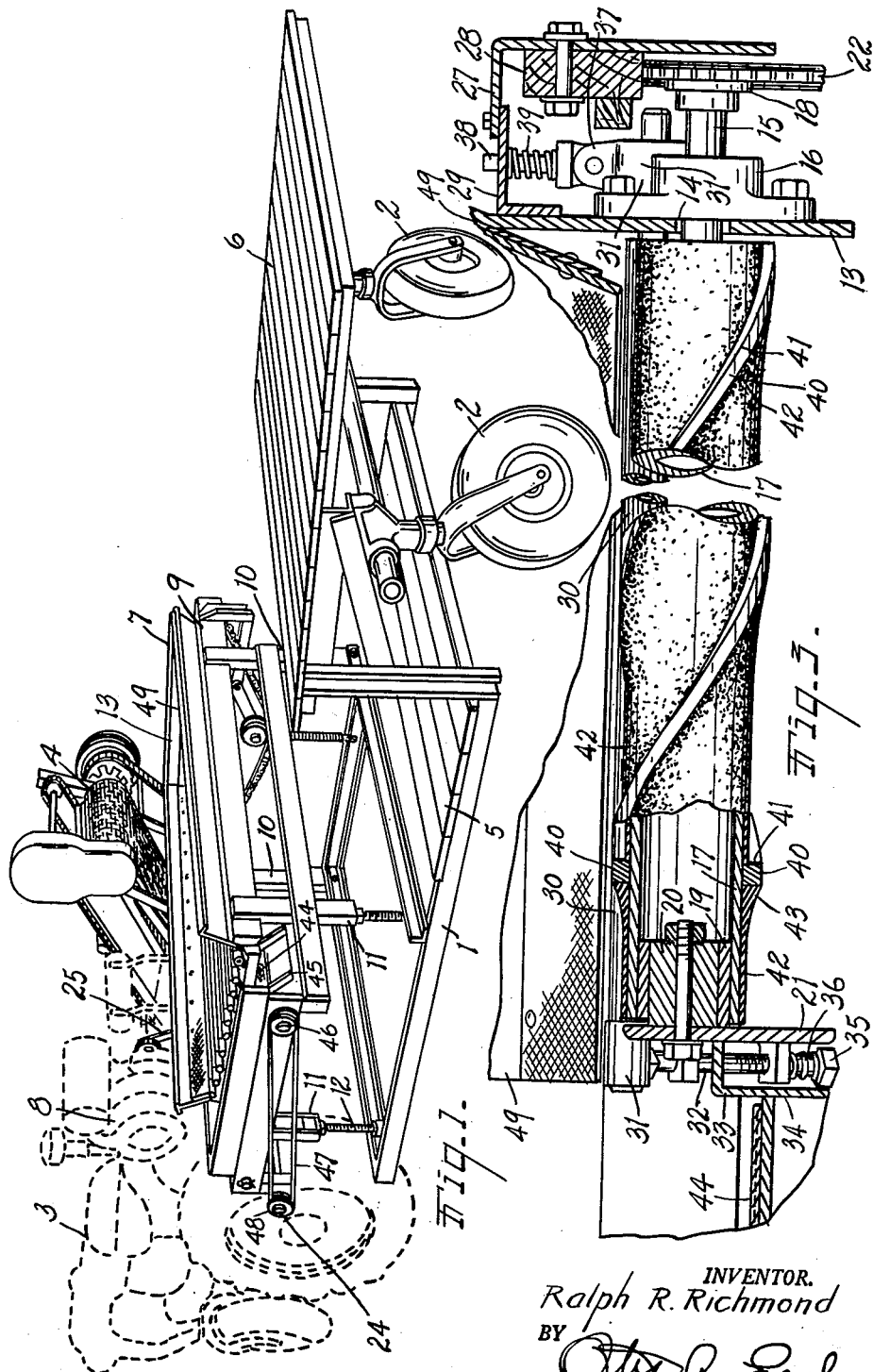
INVENTOR.
Ralph R. Richmond
BY
ATTORNEY.

April 29, 1952 — R. R. RICHMOND — 2,594,995
VEGETABLE CLEANING AND TOPPING DEVICE
Original Filed Dec. 11, 1947 — 2 SHEETS—SHEET 2
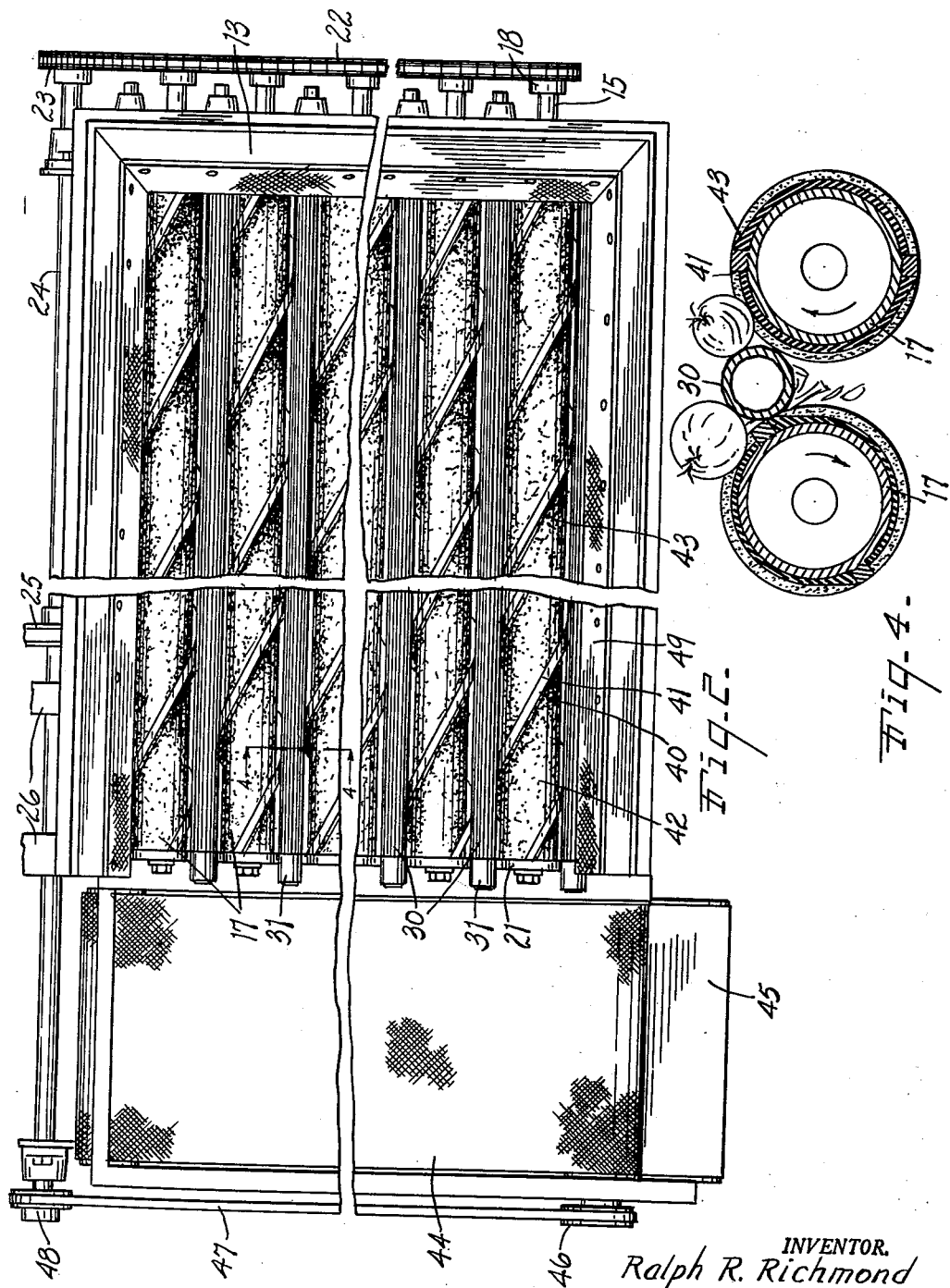

Patented Apr. 29, 1952

2,594,995

UNITED STATES PATENT OFFICE 2,594,995

VEGETABLE CLEANING AND TOPPING DEVICE

Ralph R. Richmond, Gun Plains Township, Allegan County, Mich.

Original application December 11, 1947, Serial No. 791,089. Divided and this application July 21, 1949, Serial No. 106,011

8 Claims. (Cl. 146—83)

1

This invention relates to improvements in vegetable cleaning and topping device.

The subject matter of this application has been divided from my copending application for Vegetable Harvester, Serial No. 791,089, filed December 11, 1947, which became Patent No. 2,588,764 on March 11, 1952.

The principal objects of this invention are:

First, to provide a vegetable cleaning and topping device which is readily detachable from a standard farm tractor so that the tractor may be used to move the cleaning device through the field or for ordinary farm work.

Second, to provide a novel form of cleaning and topping mechanism for sphere-like vegetables which will rapidly strip tops, loose skin and dirt from the vegetables without injury to the vegetables and convey the clean vegetables to a delivery conveyor or loading point.

Third, to provide a novel form of cutter bar and cutter bar mounting for a vegetable cleaning table which will maintain a sharp cutting edge for a long period of time and which will not damage vegetables passing thereover.

Fourth, to provide a novel arrangement of cutter bars and vegetable feeding rolls for a vegetable cleaning machine in which the cutter bars are yieldingly mounted between a pair of cleaning rolls to maintain a fixed cutting pressure against the rolls while being movable to pass hard foreign objects without injury to the cutting members.

Fifth, to provide a novel form of cleaning roll which is operative in conjunction with other rolls and cutter bars to advance vegetables to be cleaned along the roll and into cleaning engagement with the cutter bars.

Sixth, to provide a mobile adjustably mounted cleaning table which may be moved through the fields in various angularly adjusted positions so that vegetables delivered to one end of the table will be caused to move across the table in a cleaning operation regardless of varying conditions and characteristics of the vegetables, such as size, shape and degree of dryness, which would tend to vary the rate at which the vegetables would travel over the table.

Other objects relating to details of my invention will appear from the description to follow. The invention is defined and pointed out in the claims.

The drawings, of which there are two sheets, illustrate a preferred form of my cleaning and topping mechanism.

Fig. 1 is a rear quarter perspective view of my topping and cleaning mechanism as coupled to a standard farm tractor and associated with a conveyor for picking the vegetables off of the ground and delivering them to the cleaning table.

Fig. 2 is a fragmentary plan view of my topping and cleaning table and the conveyor for moving the clean vegetables from the table.

Fig. 3 is a fragmentary transverse cross sectional view through the table illustrating the mounting of the cutter bars and cleaning rolls.

Fig. 4 is a fragmentary cross sectional view transversely through the cutter bars and cleaning rolls taken along the plane of the line 4—4 in Fig. 2.

As illustrated in the drawings my cleaning and topping mechanism includes a framework or chassis 1 having a pair of castor wheels 2 for supporting the rear end thereof. The forward end of the frame is adapted to be coupled by any convenient means to the rear of a standard farm tractor indicated by the dotted lines 3. Preferably the tractor also carries vegetable pickup mechanism and a conveyor 4 for automatically delivering vegetables from the ground to the cleaning mechanism. The frame 1 includes horizontal side pieces which support a working platform 5 and a raised storage platform 6 for carrying bags or baskets of the cleaned vegetables. My cleaning and topping table generally indicated at 7 is supported forwardly of the working platform and underneath the delivery end of the pickup conveyor 4. An auxiliary gasoline engine for driving the mechanism of the cleaning table is mounted on the forward end of the cleaning mechanism as indicated by the dotted lines 8.

The cleaning table 7 consists of a generally rectangular framework 9 pivotally supported from the chassis frame 1 at its right side by the depending legs 10. The legs 11 at the left side of the cleaning table are provided with adjustable screw supports 12 so that the frame 9 and table can be leveled or inclined with respect to the chassis frame. Adjustment of the angle of the table is necessary because some vegetables, particularly onions, travel across the table at different speeds depending upon whether they are relatively wet or dry.

More specifically the right side of the cleaning table 7 consists of a plate 13 having a series of apertures 14 therethrough arranged to pass a series of shafts 15. Self-aligning bearings 16 support the ends of the shafts in the apertures. Cutter rolls 17 are secured to and rotatable with the inner ends of the shafts 15 and sprockets 18 are secured to the outer ends of the shafts. The left ends of the cleaning rolls 17 are provided with pressed in bushings 19 rotatably received on the stud bearings 20 secured to the left side plate 21. The several sprockets 18 are driven in the same direction by a chain 22 and the chain is in turn driven from a sprocket 23 on the cross shaft 24 at the front of the table. The cross shaft 24 is driven by the belt 25 from the motor 8 as is best illustrated in Fig. 2. Supports for the motor are indicated at 26 in Fig. 2.

The chain 22 and sprockets 18 are enclosed by a guard housing 27 which also serves to support a block 28 for holding the chain in engagement with the sprockets. The guard housing 27 is removably secured to an angle iron 29 welded to the outside of the right side plate 13.

Positioned between the cleaning rolls 17 are a series of cutter bars 30 which are supported at their ends by the bearings 31. The bearings at the left ends of the cutter bars 30 are supported upon pins or bolts 32 (see Fig. 3) extending downwardly through an angle iron 33 and the bosses 34 secured to the left side plate 21. Nuts 35 threaded on the lower ends of the bolts 32 serve to adjust the compression of coil springs 36 which urge the bearings and therefore the left ends of the cutter bars downwardly into cutting engagement between two adjacent cleaning rolls.

The bearings 31 at the right ends of the cutter bars are provided with yokes 37 pivotally connected to the tongues on the lower ends of guide pins 38. The guide pins extend upwardly through holes in the horizontal flange of the angle iron 29. Springs 39 compressed between the under side of the angle iron and the tongues serve to urge the right bearings and right ends of the cutter bearings downwardly.

Each of the cleaning rolls 17, which are of hollow tubular construction, are provided with a pair of spiral ribs 40 which are welded or otherwise suitably secured to the surface of the roll. The ribs 40 are of generally rectangular cross section and have their leading edges 41 ground off sharply to form a cutting edge cooperative with the cutter bars 30 as is most clearly illustrated in Fig. 4. I prefer to make the cutter bars of tubular stock having a multisided cross section. Thus the bars are substantially cylindrical but present a series of new cutting edges to the ribs 40 as the cutter bars revolve. As is most clearly illustrated in Fig. 2 I prefer to position the several cleaning rolls in angularly displaced relationship so that the ribs of one roll are displaced 90° from the ribs on the next adjacent rolls.

In order to prevent unnecessary bruising and cutting of the vegetables as they are passed over the table I cover the body of the cleaning rolls 17 with a layer 42 of relatively soft rubber-like material such as asphaltum. I taper the thickness of the covering layer from a thin layer adjacent to the trailing edges of the ribs 40 to approximately the full thickness of the ribs along the leading edges of the ribs as is indicated at 43. Then as the cutting edge 41 approaches the cutter bar 30 the vegetables will be lifted out of the notch or groove formed between the bar and roll so as not to bruise or cut the surface of the vegetable. Any tops or loose skin on the vegetable will work their way between the cleaning roll and cutter bars and will be effectively sheared off leaving the vegetables cleaned and topped and in a condition highly acceptable to the commercial market.

The left end of the frame of the cleaning table is provided with a longitudinally disposed delivery conveyor 44 which catches the vegetables discharged from the table and delivers them to a loading chute 45. The conveyor 44 is driven from a pulley 46 by the belt 47. The belt 47 is in turn driven from a pulley 48 on the left end of the cross shaft 24 so that the delivery conveyor is driven in timed relationship to the cleaning rolls 17. An operator standing on the work platform 5 can supervise the operation of the table and position crates or bags underneath the chute 45. Outwardly sloping hopper-like walls 49 are provided around three sides of the cleaning table to retain the vegetables thereon.

In operation the spiral ribs on the cleaning rolls function to advance vegetables from the right side of the table to the delivery conveyor 44 while at the same time repeatedly bringing each vegetable into cleaning engagement between the ribs and the cutter bars 30.

Having thus described my invention, what I claim as new and desire to secure by Letters Patent is:

1. Topping mechanism for a tractor drawn vegetable harvesting device comprising, a framework connectable to the rear of the tractor and having castor wheels for supporting the rear of said framework, a table frame adjustably mounted on said framework, side plates on said table frame defining a plurality of pairs of apertures, stud bearings secured to one of said plates by bolts passed through the apertures in said one side plate, a plurality of parallel cleaning rolls having one end supported on said stud bearings and with shafts extending through the apertures in the other of said side plates, self-aligning bearings secured to said other side plate and supporting said shafts, sprockets on said shafts, a chain for driving said sprockets in the same direction, a gasoline motor on said framework for driving said chain, cutter bars of multi-sided cross section positioned between adjacent cleaning rolls, spring mounted bearings for supporting said bars, the springs for said bearings being arranged to urge said bars into engagement with said rolls, spirally arranged ribs on said cleaning rolls, a covering of soft material on said rolls and tapering in thickness to a thickest portion at the leading edges of said ribs, a delivery conveyor delivering from the ends of said rolls and means for driving said delivery conveyor from the same motor for operating said rolls.

2. Topping mechanism for a tractor drawn vegetable harvesting device comprising, a framework connectable to the rear of the tractor, a table frame adjustably mounted on said framework, side plates on said table frame, one of said plates defining a plurality of apertures, stud bearings secured to the other one of said side plates, a plurality of parallel cleaning rolls having one end supported on said bearings and with shafts extending through the apertures in said one of side plates, self-aligning bearings secured to said one side plate and supporting said shafts, means for driving said shafts in the same direction, spirally wound rib on each of said rolls, cutter bars of multisided cross section positioned between adjacent cleaning rolls and having bearings at their ends, spring mounts for supporting the bearings of said bars, the springs of said mounts being arranged to urge said bars downwardly into engagement with the ribs on adjacent rolls, and a delivery conveyor delivering from the ends of said rolls.

3. In a vegetable cleaning machine the combination of a supporting frame, a plurality of elongated cylindrical parallel cleaning rolls provided with spirally disposed blades projecting from the surfaces thereof, the pitch of the blades being such that there is a substantial space between corresponding reaches thereof, said rolls being provided with non-metallic facings between the blades, the facings being of increased thickness adjacent the forwardly facing sides of the blades to constitute facings for the forward sides thereof, said rolls being driven in the same direction, freely rotatable cutter bars floatingly mounted at one end and disposed in the notches between said rolls and engaging said blades to coact with the rolls to provide trough-like work receiving recesses between the reaches of the blades, said bars being of such diameter as not to project substantially above the tops of said blades, and means for feeding work upon said rolls at one end thereof, the frame being adjustable to incline said rolls longitudinally.

4. In a vegetable cleaning machine the combination of a supporting frame, a plurality of elongated cylindrical parallel cleaning rolls provided with spirally disposed blades projecting from the surfaces thereof, the pitch of the blades being such that there is a substantial space between corresponding reaches thereof, said rolls being provided with non-metallic facings between the blades, the facings being of increased thickness adjacent the forwardly facing sides of the blades to constitute facings for the forward sides thereof, power means for rotating said rolls, and freely rotatable cutter bars floatingly mounted at one end and disposed in the notches between said rolls and engaging said blades to coact with the rolls to provide trough-like work receiving recesses between the reaches of the blades.

5. In a vegetable cleaning machine the combination of a supporting frame, a plurality of elongated cylindrical parallel cleaning rolls provided with spirally disposed blades projecting from the surfaces thereof, the pitch of the blades being such that there is a substantial space between corresponding reaches thereof, said rolls being provided with nonmetallic facings between the blades, the facings being of increased thickness adjacent the forwardly facing sides of the blades to constitute facings for the forward sides thereof, power means for rotating said rolls, and rotatable cutter bars floatingly mounted at one end and disposed in the notches between said rolls and engaging said blades to coact with the rolls to provide trough-like work receiving recesses between the reaches of the blades, said cutter bars being approximately cylindrical but having polygonal surfaces.

6. In a vegetable cleaning machine the combination of a supporting frame, a plurality of elongated parallel cleaning rolls provided with spirally disposed blades, the pitch of the blades being such that there is a substantial space between corresponding reaches thereof, power means for rotating said rolls, rotatable cutter bars disposed in the notches between said rolls and engaging said blades to coact with said rolls to support the work, and means for feeding work upon said rolls at one end thereof, said bars being of such diameter as not to project substantially above the tops of said blades.

7. In a vegetable cleaning machine the combination of a supporting frame, a plurality of elongated parallel cleaning rolls provided with spirally disposed blades, the pitch of the blades being such that there is a substantial space between corresponding reaches thereof, power means for rotating said rolls, and freely rotatable cutter bars disposed in the notches between said rolls and engaging said blades to coact with rolls to support the work and have cutting engagement with said blades, said cutter bars having polygonal surfaces, said bars being of such diameter as not to project substantially above the tops of said blades.

8. A cleaning roll for a vegetable cleaning table comprising, a tubular roll element having a bearing at one end thereof and a supporting shaft at the other end thereof, a driving sprocket secured to said shaft, a pair of rectangular ribs spirally secured to the outside of said tubular element, and a covering of soft asphaltum material on said tubular element, said covering tapering from a thin portion along the trailing edges of said ribs to a thick portion forming a substantially complete facing for the leading edges of said ribs.

RALPH R. RICHMOND.

REFERENCES CITED

The following references are of record in the file of this patent:

UNITED STATES PATENTS

| Number | Name | Date |
|---|---|---|
| 307,339 | Schindel | Oct. 28, 1884 |
| 381,748 | Armsted | Apr. 24, 1888 |
| 1,026,776 | Shirley | May 21, 1912 |
| 1,071,925 | Keith | Sept. 2, 1913 |
| 1,423,790 | Flis | July 25, 1922 |
| 1,535,500 | Skarphol | Apr. 28, 1925 |
| 1,539,874 | Scholl et al. | June 2, 1925 |
| 1,659,555 | Ayars | Feb. 21, 1928 |
| 1,765,902 | Brochet | June 24, 1930 |
| 2,414,922 | Barrett et al. | Jan. 28, 1947 |
| 2,464,438 | Davies | Mar. 15, 1949 |
| 2,527,182 | Gaddie | Oct. 24, 1950 |

OTHER REFERENCES

Popular Mechanics, July 1942, page 137, Scientific Lib.